United States Patent
Beurket et al.

[11] Patent Number: 6,122,666
[45] Date of Patent: Sep. 19, 2000

[54] METHOD FOR COLLABORATIVE TRANSFORMATION AND CACHING OF WEB OBJECTS IN A PROXY NETWORK

[75] Inventors: John Benjamin Beurket, Poughkeepsie; Peter Kenneth Malkin, Ardsley; William Gregg Rubin, Yorktown Heights; Philip Shi-Lung Yu, Chappaqua; Gunars Ziedins, Yorktown Heights, all of N.Y.

[73] Assignee: International Business Machines Corporation, Armonk, N.Y.

[21] Appl. No.: 09/027,832

[22] Filed: Feb. 23, 1998

[51] Int. Cl.[7] .................................................. G06F 15/173
[52] U.S. Cl. .......................... 709/226; 709/200; 709/217; 709/219; 709/229
[58] Field of Search .................................... 709/200, 205, 709/217, 219, 226, 229

[56] References Cited

U.S. PATENT DOCUMENTS

| | | |
|---|---|---|
| 5,673,322 | 9/1997 | Pepe et al. ............................ 380/49 |
| 5,710,887 | 1/1998 | Chelliah et al. ......................... 705/26 |
| 5,727,159 | 3/1998 | Kikinis .................................... 709/246 |
| 5,751,957 | 5/1998 | Hiroya et al. ........................... 709/203 |
| 5,751,963 | 5/1998 | Umetsu .................................. 709/223 |
| 5,754,854 | 5/1998 | Kanamori et al. ...................... 709/104 |
| 5,793,964 | 8/1998 | Rogers et al. .......................... 709/202 |
| 5,802,320 | 9/1998 | Baehr et al. ............................ 709/249 |
| 5,826,025 | 10/1998 | Gramlich .............................. 709/217 |
| 5,862,481 | 1/1999 | Kulkarni et al. ........................ 455/432 |
| 5,884,246 | 3/1999 | Boucher et al. ............................ 704/2 |
| 5,918,013 | 6/1999 | Mighdoll et al. ....................... 709/217 |

*Primary Examiner*—Zarni Maung
*Assistant Examiner*—Saleh Najjar
*Attorney, Agent, or Firm*—Ratner & Prestia

[57] ABSTRACT

A method and system provides collaborative caching of transformed Web objects in a proxy network. The proxies collaboratively provide a set of object transformations by partitioning the different types of object transformations, and caching the transformed Web objects among proxies in order to reduce duplicate object transformation and caching effort. The transformations may include language translations, currency conversions, units of measure conversions, shipping cost calculations and sales taxes calculations. Other transformations are also possible.

16 Claims, 8 Drawing Sheets

GPC LOGIC

OBJECT HANDLER

METHOD FOR COLLABORATIVE TRANSFORMATION AND CACHING OF WEB OBJECTS IN A PROXY NETWORK

FIELD OF THE INVENTION

The present invention relates to data networks and more particularly to the ability to perform transformations of data available on data networks. Specifically, a plurality of proxy servers are disclosed which furnish transformations of network data based upon the source of the data request.

BACKGROUND OF THE INVENTION

As the World Wide Web (WWW or Web) has increased in popularity, traffic over the Internet has increased considerably. The Web has now become one of the primary bottlenecks on network performance. For example, a Web user may experience noticeable delays when documents or information are requested by the user who is connected to a server via a slow network link. The Web's transferring of the information over the network to the user further increases the level of traffic over the network. The increased traffic reduces the bandwidth available for the requests of other users, contributing to additional potential delays.

To reduce access latencies for clients, the prior art has stored or cached copies of popular documents of information closer to the user at network nodes, from which the access latencies are more acceptable. The caching can be implemented at various points on the network. For example, a large university or corporation may have its own local cache, from which all the users subscribing to that network may fetch documents. A local cache may be implemented in the form of a specialized server.

A specialized server, which is called a proxy server (or caching proxy), may act as an agent on the behalf of clients to locate any potential cached copy of requested information. Proxy servers usually serve as secondary or higher level caches because proxy servers are concerned only with misses left over from failed client caches. Client caches are built into various Web browsers. Client caches may either store only the document accesses during the current invocation (nonpersistent cache such as Mosaic) or may cache documents across invocations.

Previous work on the caching of Web documents has mainly been in the area of on-demand caching. On-demand caching means a caching decision is made after an object is requested. For example, Abrams et al., "Caching Proxies: Limitations and Potentials", Proc. 4th International World Wide Web Conference, 1996, describes different on-demand caching policies that have been examined for the Web.

Under various situations, a Web user may request a document and the user may then have difficulty using the document. The document may be, for example, in a language which the Web user does not understand. Alternatively, the document may include information (e.g., units of measure, currency values, product delivery information) which are desirably converted for better understandability by the Web user.

SUMMARY OF THE INVENTION

In a network comprising a plurality of servers, a plurality of clients and a plurality of proxies which handle data between the clients and the proxies, clients request data. The client request is received at one of the proxies. The client request is determined to be satisfied by providing a transformation of original data. A proxy which is capable of generating the transformation is located. The transformation is provided to one of the clients.

DETAILED DESCRIPTION OF THE INVENTION

Figure 1:
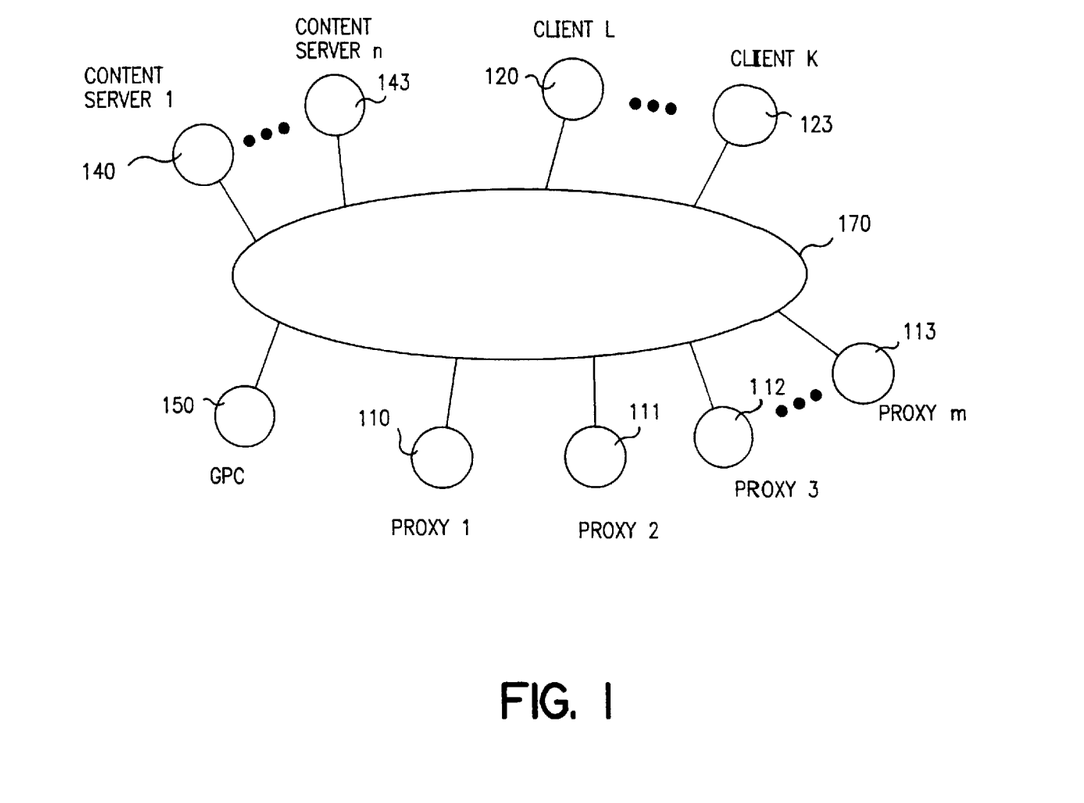
FIG. 1 is a block diagram of an Internet environment in accordance with an exemplary embodiment of the present invention.

FIG. 1 is a block diagram illustrating the overall architecture of a proxy network in accordance with an exemplary embodiment of the present invention. As shown, clients 120, 121, 122, 123 may be connected through proxy servers (or proxies) 110, 111, 112, 113 to access content servers 140, 141, 142, 143. This may be accomplished, for example, on network 170. Proxies are generally employed to facilitate network accesses, providing services such as caching or content filtering. For example, a corporation or a popular Web site may consist of a number of proxies and an Internet service provider often has a large number of proxies deployed over various locations. Alternatively, of course, in certain applications, a single proxy may be desired. Global proxy controller (GPC) 150 is a node that configures how requests flow through the proxy network. GPC 150 is also capable of assigning tasks and transformations to certain proxies.

A transformation (as referred to above) may be one of several conversions. One form of transformation is a language translation. This is the process of converting data (e.g. a document such as sales literature) from one language to another. Another form of transformation is a units of measure conversion. This is the process of converting units (e.g. weight, temperature, distance) from one measuring system (e.g. English) or another measuring system (e.g. metric). Other transformations may relate, for example, to currency conversions, data encryption techniques (e.g. a user's preferred technique), shipping charge calculations to certain geographic destinations, etc.

As an example of transformation, an exemplary embodiment of the present invention will be described with regards to language translation. The description is for illustrative purposes only, and it is understood that other transformations are possible. For language translation, GPC 150 may determine the languages handled by each proxy. For example, in one exemplary embodiment of the present invention, GPC 150 may assign a set of proxies (at least one proxy in each set) to handle the translation into each language. This is referred to as a language cluster. Each proxy may optionally be limited to only handle the translations of a few languages. Furthermore, different proxies in a language cluster can be assigned different subsets of the object space. The partition of the object space can be based on URLs. This partitioning can result in more efficient caching of the translated objects and avoid duplication of translations, i.e. a particular object gets translated at multiple proxies in the same language clusters. Thus, for each Web object request, the path through the proxy network depends upon the nature of the request, i.e. the language requested.

As an example, assume that proxy 110 is assigned translation from English to Spanish, proxy 111 is assigned translation from English to German, and proxy 112 is assigned translation from English to Italian. Furthermore, assume that client 120 is in the same geographical region (say Madrid, Spain) as proxy 110 so that it is logically connected to proxy 110. If client 120 requests a Spanish translation of a Web object, proxy 110 obtains the Web object and performs the translation. If client 120 requests a German version of the Web object, proxy 110 passes the request to proxy 111 which obtains the Web object, makes the translation and passes it back to proxy 110.

In an exemplary embodiment of the present invention, client 120 may include, for example, a personal computer (PC), a workstation, a set top box, etc. Proxy server 110 may be, for example, Internet Connection Server (ICS) sold by IBM. The network may be, for example, the Internet, the World Wide Web, an Intranet and local area networks (LANs). Content servers 140–143 may include Lotus Go Web server, and or Lotus Domino server. The proxy server or content server can run on any computing node, which includes, but is not limited to, products such as are sold by IBM under the trademarks S/390 SYSPLEX, SP2, or RS6000 workstations. Typical service requests include World-Wide-Web page accesses, remote file transfers, electronic mail, and transaction support.

Figure 2:
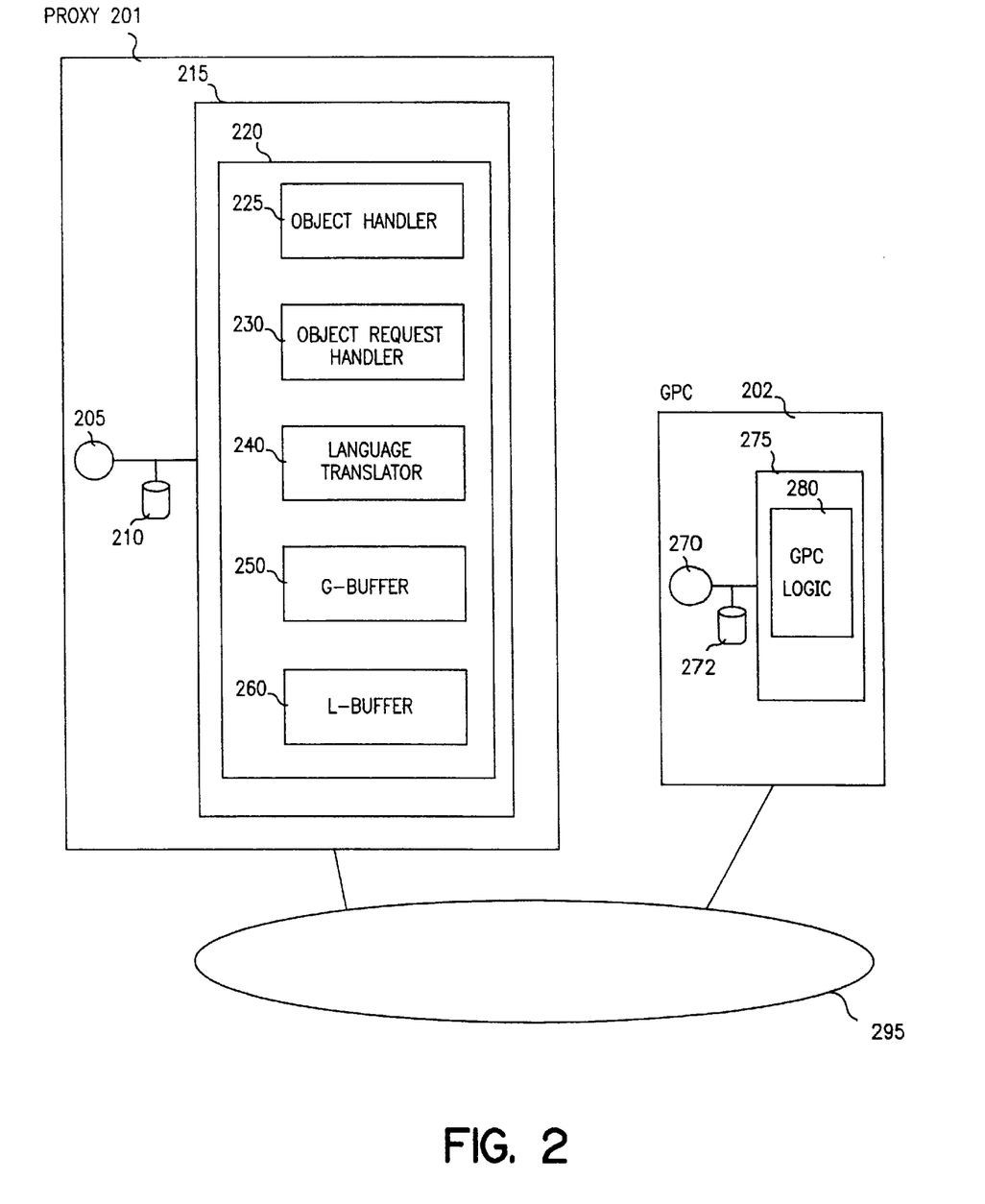
FIG. 2 is a block diagram which illustrates a proxy environment in accordance with an exemplary embodiment of the present invention.

FIG. 2 is a block diagram, which illustrates a general proxy environment in accordance with an exemplary embodiment of the present invention. Proxy server node 201 is used to represent a computing node that can service requests through network 295. Proxy server node 201 preferably includes a CPU 205, memory 215 such as RAM, and storage devices 210 such as DASD. Proxy server logic 220 may be situated within memory 215. Proxy server logic 220 may preferably be embodied as computer executable code, which is loaded from DASD 210 into memory 215 for execution by CPU 205. Proxy server logic 220 is described in greater deal with reference to FIG. 4. Proxy server logic includes object handler 225 (with details depicted in FIG. 6) and object request handler 230 (with details depicted in FIG. 5). Language translator 240, which translates a given block of text from one language to another, may also be included in proxy server logic 220. Language translator 240 may be a program which is described, for example, in Bennett, W. S. et al., "The LRC Machine Translation System," The Journal of Computational Linguistics, Vol. 11, Numbers 2–3, April–September 1985, 111).

Proxy server logic 220 may also include G-buffer 250 and L-buffer 260. G-buffer 250 is used to cache the object translated or transformed by the proxy to avoid repeated translations (or transformations) when requested again in the future. The L-buffer 260 is used to cache recently accessed objects to reduce network access delay for repeated accesses. L-buffer 260 can be used to cache objects not translated locally. In an exemplary embodiment of the present invention, management of G-buffer 250 and L-buffer 260 may be accomplished using different methods. The G-buffer replacement policy may take into account the translation or transformation cost. The caching value (referred to as G-value) increases with the processing cost of the transformation or translation. The L-buffer replacement policy takes into account the network access cost or network delay. The caching value (referred to as L-value) increases with the access cost of the object. The relative sizes of the two buffers will depend on the average transformation cost (i.e. the time needed to perform the transformation). The higher the average translation/transformation cost relative to the average network access delay, the larger the G-buffer size relative to the L-buffer size. For example, for language translation, the translation cost is quite high and the G-buffer size can be chosen to be ten times the L-buffer size.

Those skilled in the art will also appreciate that there are many different variations of providing different management methods to manage the different groups of objects in the different language translations and object space partitions. More than two buffers or logical buffer partitions can be maintained to provide finer granularity of different treatments. The size of each buffer can be determined a priori based on transformation cost, reference (access) frequency or other workload characteristics. The buffer sizes can also be changed dynamically based on the run-time workload behavior. Furthermore, there are many other variations of replacement policies that can be applied to manage the buffer, including: Least-Recently-Used (LRU), putting restrictions on the size of the cacheable objects or other buffer admission policies, replacing incoming objects with larger objects, etc.

GPC node 202 is an exemplary computing node that can manage the proxy network and assign translation or transformation tasks to proxy nodes 201. GPC node 202 preferably includes CPU 270, memory 275 (e.g. RAM), and storage devices 272 (e.g. DASD). Memory 275 includes GPC logic 280 (with details depicted in FIG. 3) preferably embodied as computer executable code which is loaded from DASD 272 into memory 275 for execution by CPU 270.

Figure 3:
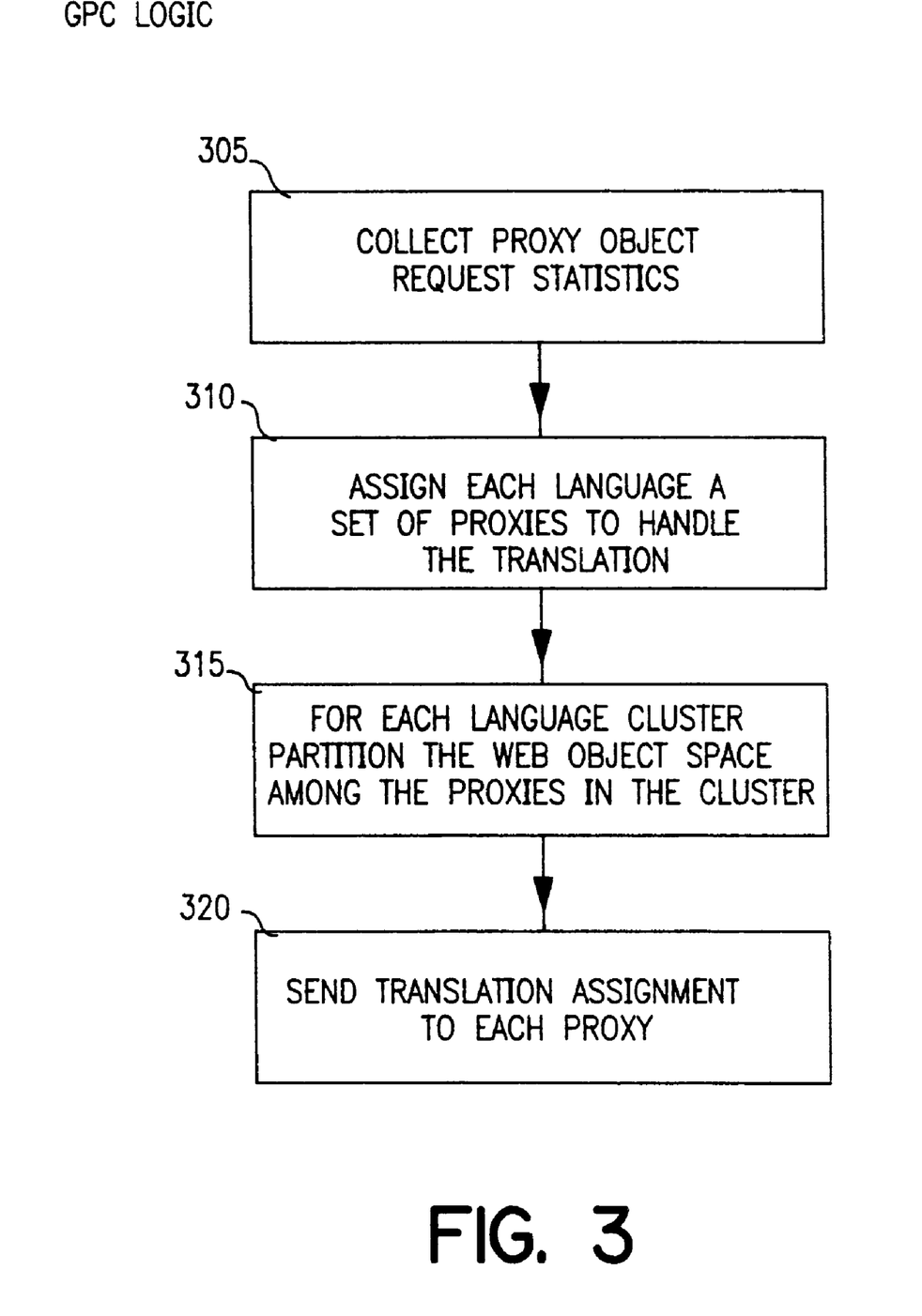
FIG. 3 is a flowchart diagram which illustrates the configuration of proxy servers in accordance with an exemplary embodiment of the present invention.

FIG. 3 is a flow chart diagram, which illustrates the configuration of proxy servers in accordance with an exemplary embodiment of the present invention. At step 305, GPC node 202 collects the proxy request statistics from each proxy to determine the composition of requests in terms of languages. For example, for a proxy located in Beijing, 80% of the requests may require translation into Chinese, 10% of the requests accepting the (unmodified) English version, and the rest desiring translations into other languages. At step 310, based on the request composition, GPC node 202 can assign a set of proxies to handle the translation of each language. Each such set of proxies is referred to as a proxy cluster for its assigned language or simply a language cluster. In an exemplary embodiment of the present invention, proxies are assigned the handling of the languages with a presence of more than x percent, say 15% of all object requests. If there are not enough proxies (or no proxy) assigned the translation of a particular language (e.g., Sanskrit), the processors receiving the largest number of requests for that language are assigned to the language cluster (i.e., will be assigned the handling of that language). At step 315, the GPC node 202 further divides the translation load among the proxies in a language cluster. In an exemplary embodiment of the present invention, GPC node 202 uses a hash partitioning method to partition the Web object space based on the URL of a Web object. The URL of a Web object is hashed to a hash table entry, and the hash table entries are partitioned among the proxies in the language cluster. The number of hash table entries assigned to each proxy can depend upon its processing power. Other factors to be considered can include the loads assigned to it, e.g. the number of languages handled by a proxy. At step 320, the assignment information is sent to all proxies.

Those skilled in the art will appreciate that there are many different variations of partitioning the proxies for translation or transformation tasks. This is true for both the language assignment and object space partitioning. This assignment or partitioning can also be done or modified dynamically to balance the load among proxies. For example, if an event with great interest to a particular ethnic/language group occurs, the translation load for a particular language can suddenly increase. Dynamically reassigning more proxies to handle the translation of that language can balance the proxy load and improve the response time. One way to do this is to dynamically monitor the loads on each proxy, sort them in increasing load order and reassign the proxies with the least load to the most overloaded language groups. If the load within a language group is unbalanced, then re-partitioning the object space can be performed to reduce the objects (or hash table entries) assigned to the overloaded proxies, reassigning them to the least loaded proxies in the language group. Furthermore, the object space partitioning need not be a strict partitioning. It can allow replication of (popular) objects to be cached or handled by multiple proxies in the language group.

Those skilled in the art will also appreciate that each language cluster can also form a proxy hierarchy. A cluster hierarchy with a treelike structure has a root node. In this case, a proxy receiving a request requiring a language translation not handled locally can forward the request to the root of the language cluster. The cluster root then sends the request down the hierarchy to the appropriate proxy handling the object space partition containing the requested object. This reduces the amount of information exchange needed in the case of dynamic (language) assignment or partition adjustment in order for each proxy to have up-to-date information to determine where to forward a request for translation. To reduce the number of forwards through the proxy hierarchy required to reach the desired proxy, each proxy performing the object translation can include its ID (e.g. the IP-address) in the header when returning the translated object. A proxy node can maintain an address stack to track, for each recently requested object translation, the proxy ID handling the translation. So for a repeated request, a proxy node can go directly to the target language proxy handling the object (without going through the proxy hierarchy of the language) to get the translated object, if it is not cached in its L-buffer. The Platform for Internet Content Selection ("PICS") protocol specifies one method of sending meta-information concerning electronic content. PICS is a Web Consortium Protocol Recommendation (see http://www.w3.org/PICS). PICS protocol can be used to pass the proxy ID handling the translation (by using a PICS category value to represent the proxy ID) back to the requester.

Figure 4:
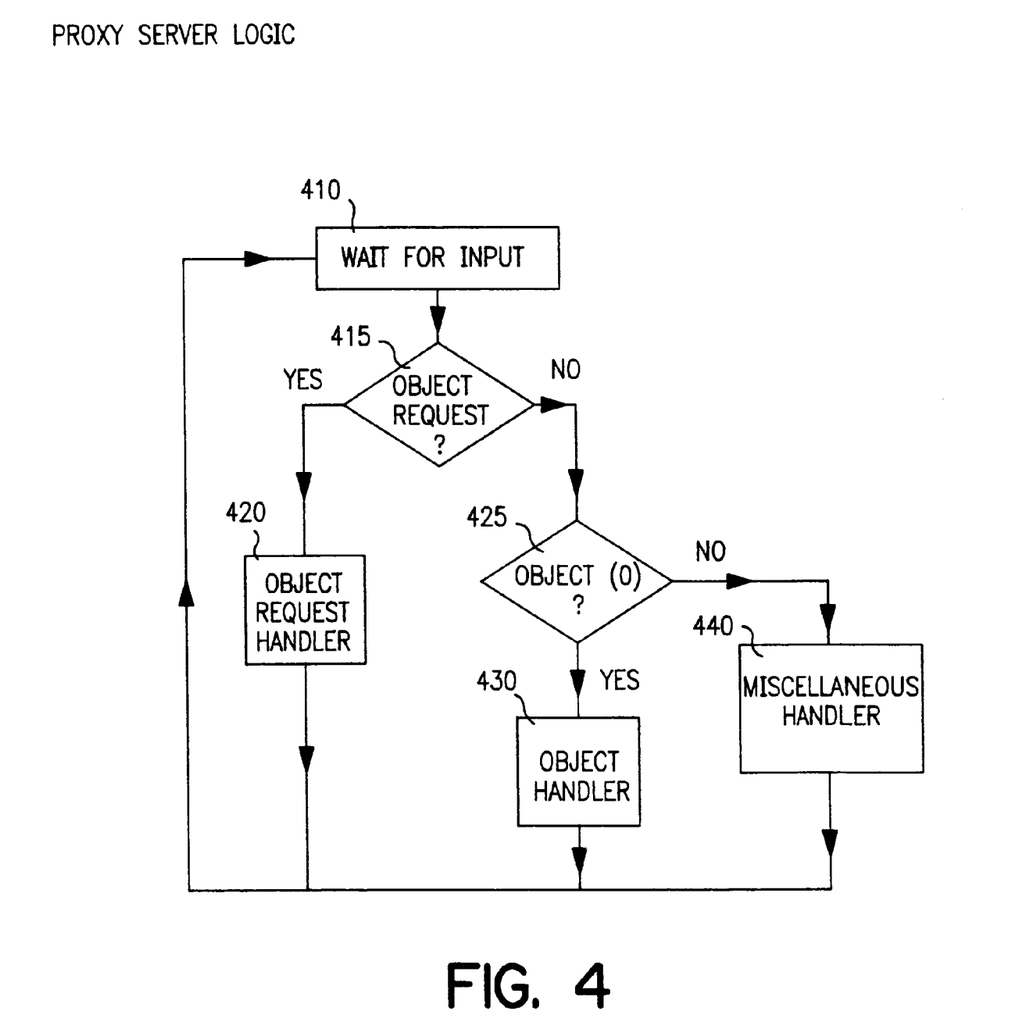
FIG. 4 is a flowchart diagram which illustrates operation of a proxy server when it is receiving input in accordance with an exemplary embodiment of the present invention.

FIG. 4 is a flow chart diagram which illustrates operation of a proxy server when it is receiving input in accordance with an exemplary embodiment of the present invention. At step 410, the proxy server waits for the input. Depending upon the input received, different actions will be taken. If the input received is an object request at step 415 (e.g. an HTTP request from a conventional web browser), then object request handler 230 is invoked at step 420. A detailed exemplary implementation of object request handler 230 is described with reference to FIG. 5. If the input received is an object O (e.g. an object returned to the current proxy server in response to a request the proxy server made, see steps 520 and 545) at step 425, the object handler at step 430 is invoked. A detailed exemplary implementation of the object handler is described with reference to FIG. 6. For other types of inputs, such as FTP requests, the miscellaneous handler is invoked at step 440.

Figure 5:
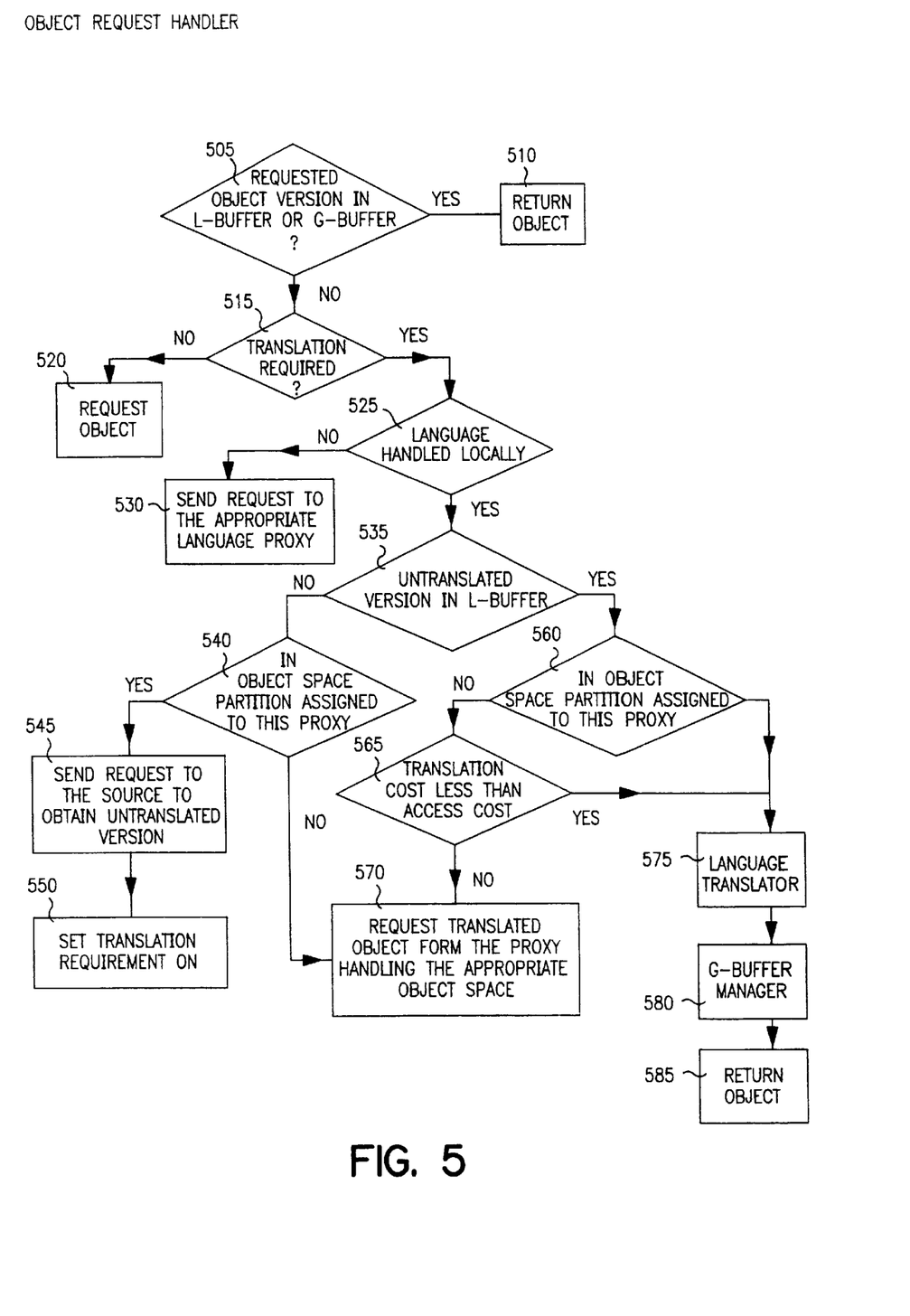
FIG. 5 is a flowchart diagram which illustrates a proxy server receiving a client request in accordance with an exemplary embodiment of the present invention.

FIG. 5 is a flow chart diagram, which illustrates a proxy server receiving a client request in accordance with an exemplary embodiment of the present invention. At step 505, the proxy first checks to see whether the requested object O, which may be a translated version, is in the L-buffer or the G-buffer. If it is in either buffer, the object O is returned to the requester at step 510. Otherwise, at step 515, a determination is made as to whether the requested object should be translated. If a translation is not needed, then, at step 520, the object is requested from the content server. Otherwise, at step 525, it is checked whether the requested language translation (or transformation) can be carried out at this proxy. If the language is not handled by this proxy, at step 530, the object request is forwarded to the appropriate language proxy which can handle the requested language translation (or transformation) and also the Web object. Otherwise, at step 535 it is checked whether there is an unmodified version in the L-buffer. If not, at step 540 it is checked whether this requested object is to be handled by this proxy, i.e. whether this object is in the object space partition assigned to this proxy, and thus a caching candidate for the G-buffer. If so, the proxy sends a request to get the unmodified version in step 545 and sets the translation requirement on for this object at step 550. This condition is checked at step 605 as described below with reference to FIG. 6 when the object handler is invoked to handle the object requested at step 545. At step 560, it is checked whether this object is in the object space partition assigned to this proxy. If so, then at step 575 the language translator 240 is invoked to translate the object. At step 580, the G-buffer manager (depicted in FIG. 8) is invoked to cache the translated object. In step 585, the translated object is returned to the requester. In step 565, it is checked to determine whether the translation cost is less than the access cost. If not, then at step 570 the proxy requests the specific (translated) language version of the object from another proxy handling the language and the appropriate object space (containing the requested object).

Figure 6:
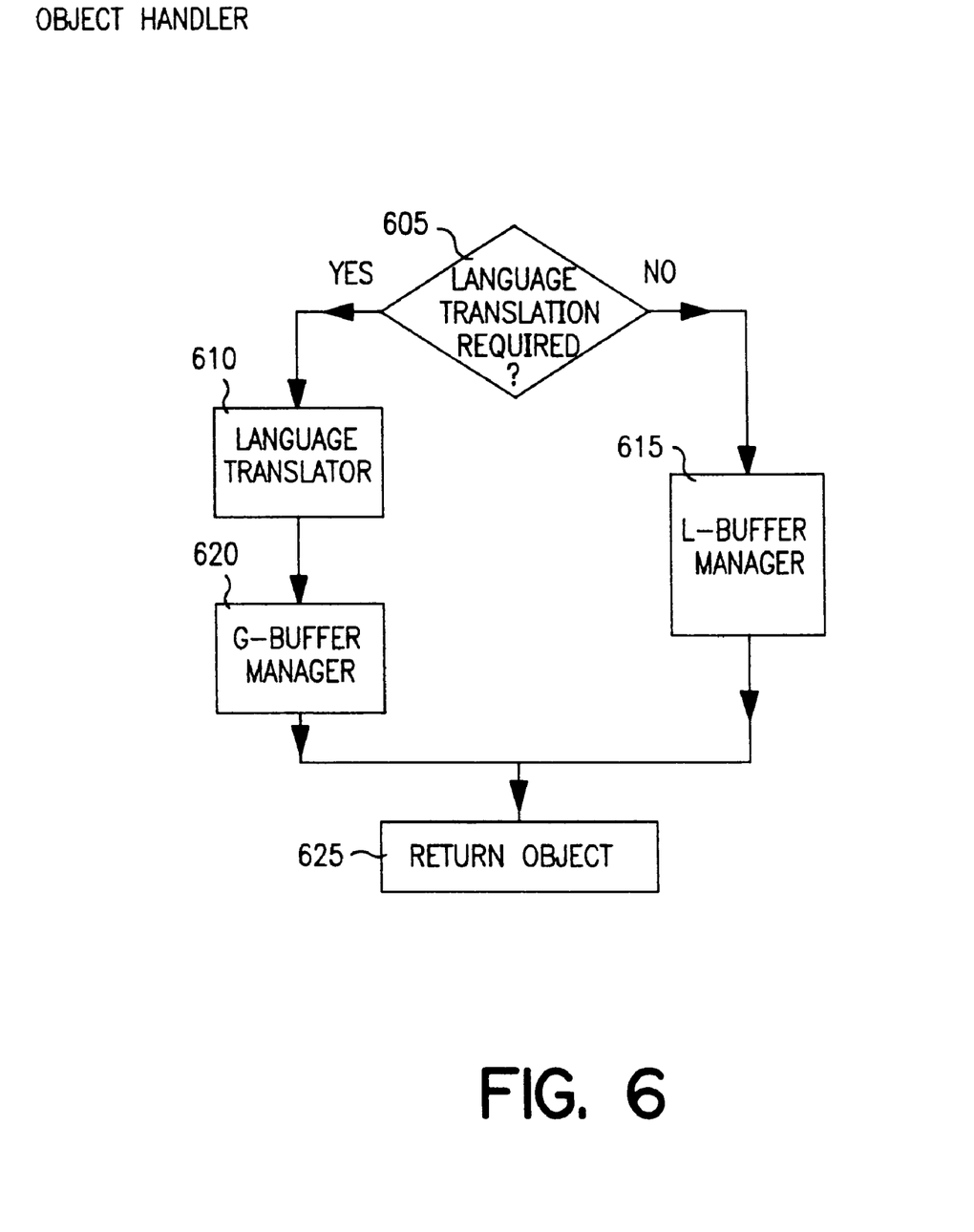
FIG. 6 is a flowchart diagram which illustrates a proxy server determining whether a transformation is desired in accordance with an exemplary embodiment of the present invention.

FIG. 6 is a flow chart diagram which illustrates a proxy server receiving a client request in accordance with an exemplary embodiment of the present invention. FIG. 6 relates to object handler 225 of FIG. 4. At step 605, it is determined whether the object received needs language translation. If so, language translator 240 is invoked to make the translation at step 610, and the G-buffer manager is invoked to cache the translated object at step 620. Otherwise, at step 615, the L-buffer manager (depicted in FIG. 7) is invoked to cache the received object. At step 625, the requested version of the object is sent to the requester.

Figure 7:
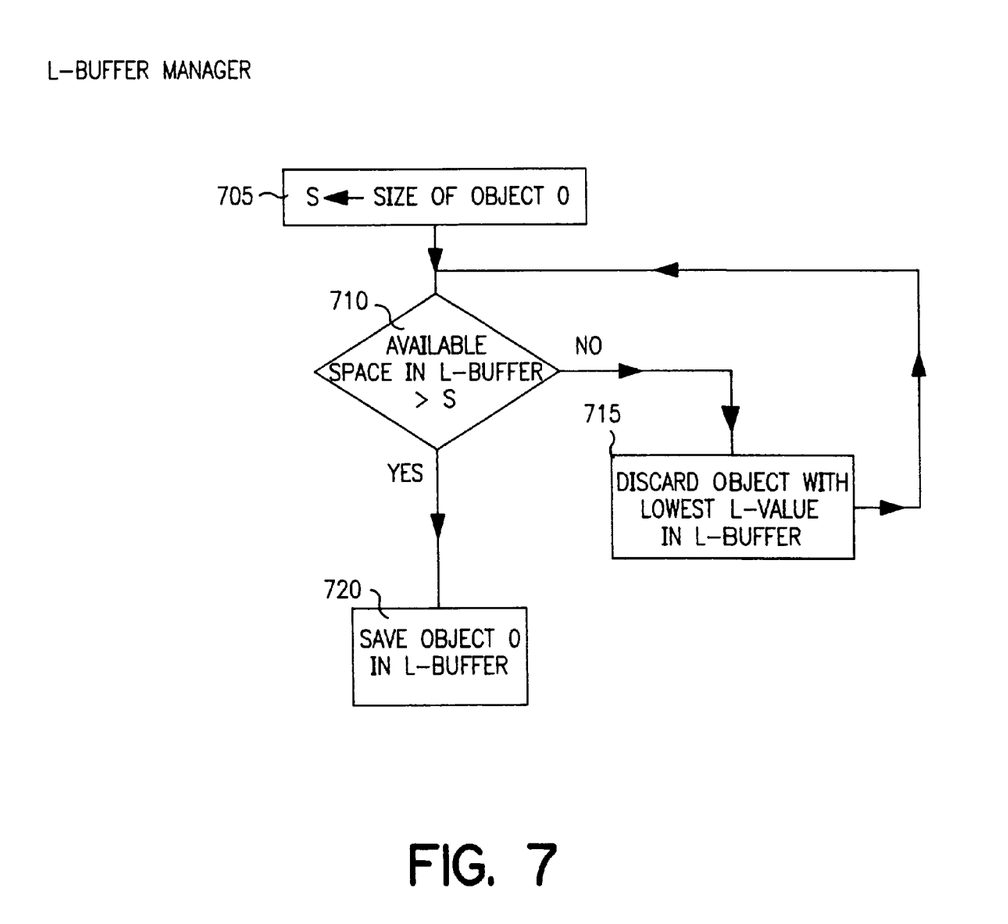
FIG. 7 and FIG. 8 are flowchart diagrams illustrating operation of the L-buffer manager and the G-buffer manager, respectively, in accordance with an exemplary embodiment of the present invention.

FIG. 7 is a flow chart diagram illustrating operation of the L-buffer manager. At step 705, S is set equal to the object size of object O. At step 710, it is determined whether the available space in L-buffer is larger than S (so the object can be cached). If so, then at step 720, the object is cached in L-buffer. Otherwise, at step 715, the buffer replacement method for the L-buffer is invoked where the object with the lowest L-value in the L-buffer is discarded, where the L-value of an object is defined to be the access frequency multiplied by the access delay for the object divided by the object size, where the access frequency can be estimated as the inverse of the time since last reference.

Figure 8:
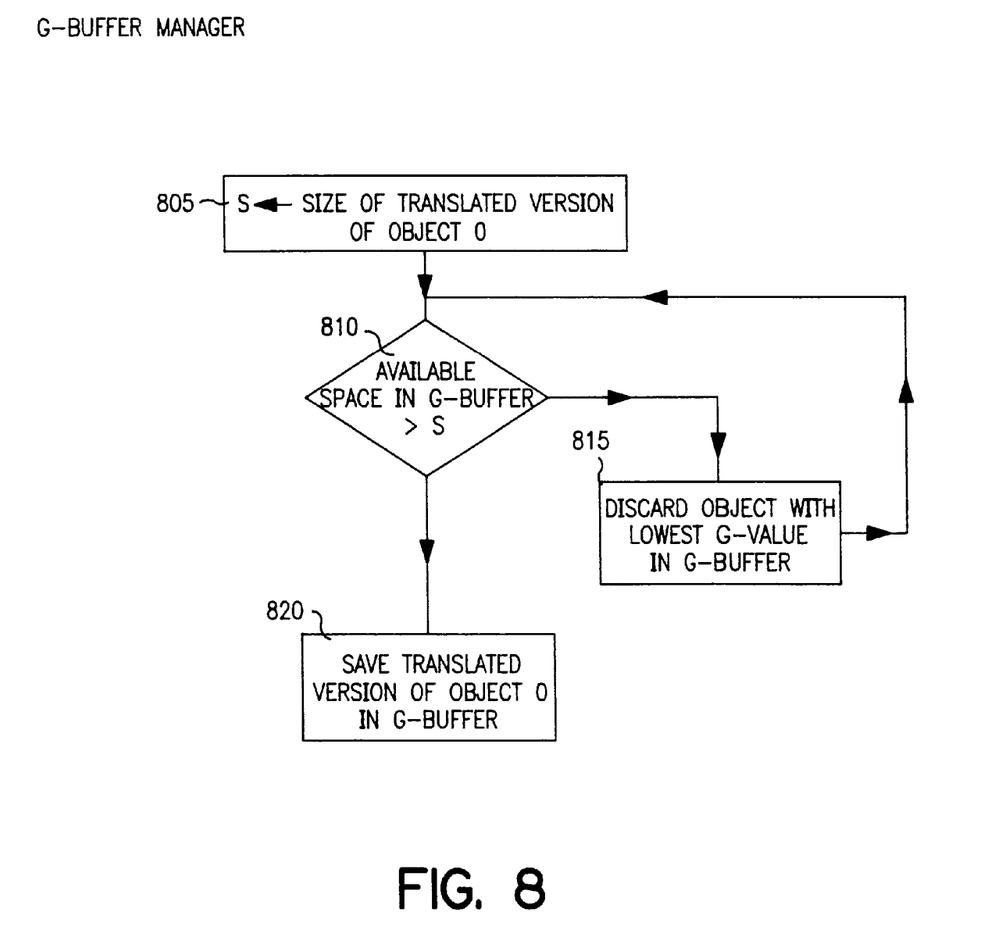

FIG. 8 is a flow chart diagram which illustrates operation of the G-buffer manager. At step 805, S is set equal to the object size of the translation version of object O. At step 810, it is determined whether the available space in G-buffer is larger than S (so the translated object can be cached). If so, at step 820, the translated object is cached in G-buffer. Otherwise, at step 815, the buffer replacement method for the G-buffer is invoked. Thus, the object with the lowest G-value in the G-buffer is discarded, where the G-value of a translated object is defined to be the access frequency multiplied by the processing cost for the translation divided by the size of the translated object.

Those skilled in the art will appreciate that the transformation or translation method of the present invention is not limited to HTTP proxy. The transformation can occur in other proxy environments, such as mail proxy to provide transformation or language translation on E-mail.

As described above, transformed Web objects are cached in a proxy network in order to reduce transformation processing (which can cause excessive access delay) by assigning the proxies to perform specific types of object transformations and cache transformed objects with different preferences.

The proxy division/grouping can take into account the common user request patterns at each proxy.

Furthermore, each proxy can apply different caching management to different groups of objects such as transformed object versus original object. Proxies may maintain separate buffers to address different requirements such as reducing transformation cost versus network delay. When a proxy makes an object transformation, the newly transformed object can be cached. One or more of the currently cached objects may need to be replaced to make space available. The order of removal of the objects by the buffer replacement method may be prioritized based not only on the size and the frequency of access of an object, but also on the transformation cost. Even if an object does not need to be transformed by a proxy, it can still be cached based on a different criterion such as access time.

According to still another aspect of the present invention, each type of transformation is assigned to a subset of the proxy nodes. The proxies collaborate on the division or specialization of transformation task. When a proxy receives an object request requiring transformation not performed locally, it will forward the request to the appropriate proxy to perform the transformation. For proxies assigned to perform the same type of transformation, the object space can be partitioned so that each proxy provides preference to transform and/or cache a subset of the Web objects, i.e. objects in the object space partition assigned to it. This further partitioning can reduce duplication of caching or transformation with minimum communication cost.

According to still another aspect of the present invention, the method is applied to language translation of Web objects, where translation of each language is assigned to a subset of the proxies.

Methods are also provided to enable the present invention to support global on-line retail electronic commerce. In particular, methods are provided which enables buyers from a given location or country to have the Web pages and forms through which they order products translated into their local language (e.g., customers from Brazil can have their web order forms translated in Portuguese). Furthermore, methods are provided allowing other factors, such as units of measure, currency, shipping costs and taxes to be tailored or translated for the buyer, e.g., buyers from Japan can have prices translated into yen. Methods are also provided to encrypt requested or purchased data using the buyer's preferred technique.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. In a network comprising a plurality of servers, a plurality of clients and a plurality of proxies which handle data transfers between said clients and said servers, a method for responding to a first client request for data from one of said clients and a second client request for data from another of said clients comprising the steps of:

receiving said first client request and said second client request;

determining that said first and second client requests are for respective first and second transformations of data;

dividing said plurality of proxies into a plurality of sets of one or more proxies;

preassigning each set to perform a different one of a plurality of transformations;

directing said first request for said first client transformation to one of said sets based on said preassigning;

directing said second request for said second client transformation to another of said sets based on said preassigning; and providing said first and second client transformations.

2. A method of responding to a client request according to claim 1, further comprising the steps of:

receiving a further client request at said one of said proxies from said one of said clients;

determining that said further client request is for original data; and providing said original data to said one of said clients.

3. A method for responding to a client request according to claim 1, wherein said one of said proxies performs said transformation.

4. A method for responding to a client request according to claim 1, wherein another of said proxies performs said transformation and said one of said proxies obtains said transformation from said another of said proxies.

5. A method for responding to a client request according to claim 2, wherein said original data is stored in and provided from said one of said proxies.

6. A method for responding to a client request according to claim 2, wherein said original data is stored in another of said proxies and wherein said original data is transferred from said another of said proxies to said one of said proxies so that said original data is provided to said one of said clients.

7. In a network comprising a plurality of source servers, each associated with sales information, a plurality of clients each making requests for said sales information, wherein each client request corresponds to one of a plurality of users and a plurality of proxies which receive said requests for sales information from said clients, a method of satisfying said requests for sales information, comprising:

dividing said plurality of proxies into a plurality of sets of one or more proxies wherein each of the plurality of sets of one or more proxies performs a respectively different translation based on a preassignment;

directing a first translation request to a first set of one or more proxies based on said preassignment;

directing a second translation request to a second set of one or more proxies based on said preassignment;

performing said first translation at said first set of one or more proxies after receiving said sales information from one of said source servers;

performing said second translation at said second set of one or more proxies after receiving said sales information from one or another of said source servers; and providing said first and second translations.

8. A method of satisfying said requests for sales information according to claim 7, wherein said translation is a language translation.

9. A method of satisfying said requests for sales information according to claim 7, wherein said translation is a currency conversion.

10. A method of satisfying said requests for sales information according to claim 7, wherein said translation includes a tax calculation.

11. A method of satisfying said requests for sales information according to claim 7, wherein said translation includes a shipping cost calculation.

12. A method of satisfying said requests for sales information according to claim 7, wherein said translation is a units of measure conversion.

13. A method of satisfying said requests for sales information according to claim 7, wherein said translation corresponds to a geographic location of said one of said clients.

14. A method of satisfying said requests for sales information according to claim 7, wherein said translation is selected by said one of said clients.

15. A method of satisfying said requests for sales information according to claim 7, wherein said translation is an encryption.

16. A method of satisfying said requests for sales information according to claim 7, wherein said translation is a translation expected by said one of said clients.

* * * * *